2,739,077
Patented Mar. 20, 1956

2,739,077
PRODUCT AND PROCESS

Max T. Goebel, Landenberg, Pa., assignor to E. I. du Pont de Nemours and Company, Wilmington, Del., a corporation of Delaware No Drawing. Application March 6, 1952,
Serial No. 275,247

6 Claims. (Cl. 106—308)

This invention relates to inorganic siliceous particles having an average specific surface area of at least 1 square meter per gram, having chemically bound to the silicon atoms on the surface of said particles at least one —$OCH_2(CF_2)_nX$ group per square millimicron of surface area of the siliceous solid, where X is a member of the group consisting of hydrogen and fluorine and $n$ is an integer from 1 to 17. This invention further deals with a method of preparing these surface-modified siliceous particles.

The method of preparation of the above surface-modified siliceous particles comprises chemically reacting substrate particles of inorganic siliceous material having an average specific surface area of at least 1 square meter per gram with a monohydric fluorocarbon alcohol represented by the formula (1)     $X(CF_2)_nCH_2OH$ where X is hydrogen or fluorine and $n$ is a positive integer of from 1 to 17.

The products of my invention are a specific kind of siliceous solids. Some of these products I refer to hereafter as estersils. Estersils are solids made by chemically reacting alcohols with certain supercolloidal siliceous solids. The reaction I have called esterification and the chemically bound —$OCH_2(CF_2)_nX$ groups resulting  therefrom I have called substituted ester groups.

For a detailed description of estersils prepared from primary and secondary unsubstituted monohydric alcohols, reference is made to the copending U. S. application of Ralph K. Iler, Serial No. 171,759, filed July 1, 1950, now abandoned, or to Iler, United States Patent 2,657,149, issued October 27, 1953, as a continuation in part of said application Serial No. 171,759, in which estersils of that class are claimed.

THE SUBSTRATE

The materials used to form the skeleton or internal structure, the so-called substrate, of the products of my invention are solid inorganic siliceous materials. They contain substantially no chemically bound organic groups. They have reactive surfaces which I believe to result from surface silanol (—SiOH) groups. The substrate materials can be mineral or synthetic in origin. They can be amorphous silica. They can be water-insoluble metal silicates. They can be water-insoluble metal silicates coated with amorphous silica.

For the purposes of this invention the substrate particles should have an average diameter greater than about 1 millimicron. Substrate particles in which the ultimate units have diameters of at least 5 millimicrons but less than 100 millimicrons are preferred. Another preferred type of substrate particles are supercolloidal aggregates or pulverulent solids.

It is further preferred that the inorganic siliceous solids be porous, that is, they should have exposed surfaces in the interior of the particle which are available to the exterior so that liquids and gases can penetrate the pores and reach the exposed surfaces of the pore walls. In other words, the solid forms a three-dimensional network or webwork through which the pores or voids or interstices extend as a labyrinth of passages or open spaces.

Especially preferred are porous inorganic siliceous solids having average pore diameter of at least four millimicrons. The large pores afford easy access for alcohol molecules in the subsequent esterification to give the products of the invention.

The substrate particles have large surface areas in relation to their mass. The term used herein and the one normally so used in the art to express the relationship of surface area to mass is "specific surface area." Numerically, specific surface area will be expressed in square meters per gram (m.²/g.).

According to the present invention, the substrate particles have an average specific surface area of at least 1 square meter per gram and preferably the average specific surface area is at least 25 m.²/g. In the case of precipitated amorphous silica, a preferred material, there is an optimum range of about 200 to 400 m.²/g., based on the fact that in this range the supercolloidal particles or aggregates can be obtained in a dry state without bringing about a considerable collapse of the porous structure by replacing the water with a water-miscible organic solvent such as acetone and then drying. This powder is especially suitable for subsequent esterification. It is, of course, possible to produce very voluminous aerogels by processes of the prior art, having surface areas of from 200 to 900 m.²/g. Such highly porous forms of silica can be surface-esterified by the process of this invention.

Specific surface area, as referred to herein, is determined by the accepted nitrogen adsorption method described in an article "A new method for measuring the surface areas of finely divided materials and for determining the size of particles" by P. H. Emmett in Symposium on New Methods for Particle Size Determination in Sub-Sieve Range, published by the American Society for Testing Materials, March 1951, page 95. The value of 0.162 square millimicron for the area covered by one surface adsorbed nitrogen molecule is used in calculating the specific surface areas.

Pore diameter values are obtained by first determining pore volume from nitrogen adsorption isotherms as described by Holmes and Emmett in Journal of Physical and Colloid Chemistry 51, 1262 (1947). From the volume figure, the diameters are obtained by simple geometry assuming cylindrical pore structure.

Determinations of gross particle size and shape of substrate material are suitably made by a number of standard methods whose choice for use in a particular case depends upon the approximate size and shape of the particles and the degree of accuracy desired. Thus, for coarse materials, the dimensions of individual particles or coherent aggregates can be determined with the unaided eye and ruler or calipers. For more finely powdered material, the light microscope is used with a calibrated scale. For materials having a particle size in the range of from 2 or 3 microns down to 5 millimicrons, the electron microscope is used. Particle size determination using an electron microscope is described in detail by J. H. L. Watson in Analytical Chemistry 20, 576 (1948).

While various inorganic siliceous solids having the aforementioned properties can be used as substrate materials in preparation of the products of my invention, precipitated amorphous silica is particularly preferred. Such silica is characterized by X-rays as lacking crystalline structure.

The preparation of several suitable amorphous silicas is illustrated in the examples. For a detailed discussion of sources of amorphous silica for use in preparing estersils of primary and secondary alcohols, reference should be had to the copending U. S. application of Ralph K. Iler, Serial No. 171,759, filed July 1, 1950, now abandoned.

Instead of silica, water-insoluble metasilicates can be used as the substrate. Such metasilicates can be prepared, as is well known in the prior art, by treatment of silicas with metal salts or hydrous metal oxides, excluding those containing only alkali metal ions. Such metasilicates can be prepared so as to have a large number of silanol (—SiOH) groups on the surface of the particle. Thus metal silicates having a large proportion of metal ions on the surface may be activated for esterification by washing with acids to remove a portion of the metal ion and leave surface silanol groups.

Crystalline metal silicates occurring in nature can also be used. However, the proportion of silanol groups on most minerals is very small since the surfaces also contain metal hydroxy groups, silicon oxygen groups and adsorbed metal ions. Therefore, before esterification it is necessary to introduce silanol groups on the surface. Loosely adsorbed metal ions may be exchanged for hydrogen ions by washing the dilute acids or by treatment with ion exchange resins. In some cases, more vigorous treatment, such as reaction with acids at low pH and often at elevated temperatures are required to give a material which will contain a sufficient number of silanol groups in the surface to yield an organophilic product on esterification.

Alternatively or additionally, silanol groups can be introduced on the surface of metal silicates by coating them with a layer of amorphous silica. This is accomplished by treating, say, sodium silicate with an acid in the presence of the mineral silicate particles under such conditions that the silica formed will deposit as a coating on the mineral particle.

Mineral crystalline silicates which can be used in preparing the substrate particles are as follows: the asbestos minerals, such as chrysotile asbestos and serpentine (hydrous magnesium silicate) and amphiboles such as crocidolite asbestos (a sodium magnesium iron silicate), amosite (an iron silicate), tremolite (a calcium magnesium silicate), and anthothyllite (a magnesium iron silicate); clay materials, such as halloysite (an aluminum silicate), attapulgite (a magnesium aluminum silicate), hectorite (a magnesium lithium silicate), nontronite (magnesium aluminum iron silicates); the kaolins, such as kaolinite, nacrite and dickite (aluminum silicate); and bentonites, such as beidillite, saponite and montmorillonite (magnesium aluminum iron silicates); and micaceous minerals, such as phlogopite (a potassium magnesium aluminum silicate), muscovite (a potassium aluminum silicate), biotite (a potassium iron aluminum silicate) and vermiculite (a hydrous magnesium iron aluminum silicate).

THE ESTERIFYING AGENT

The inorganic siliceous solids described above are reacted with monohydric fluorine-containing alcohols having from 2 to 18 carbon atoms and having a fluorine to carbon ratio of at least 1 to give the products of the invention. The alcohols herein called esterifying agents are represented by formula 1 shown above.

The preferred esterifying agents are alcohols which can be represented by the formula (2) $\quad H(CF_2)_nCH_2OH$ where $n$ is a positive integer from 2 to 16. Particularly preferred are those alcohols or formula 2 wherein $n$ is 4 or 6.

Alcohols represented by formula 2 can be prepared in accordance with the process described and claimed in U. S. 2,559,628, which issued to Robert M. Joyce, Jr., July 10, 1951. In brief, the process of Joyce comprises heating at a temperature of 50° to 350° C. in the presence of a catalyst a completely halogenated fluorethylene having the formula $CX_2CX_2$ containing at least two fluorine atoms with a primary or secondary alcohol which is free of non-aromatic unsaturation.

Another class of alcohols useful as esterifying agents in the process of my invention may be represented by the formula (3) $\quad CF_3(CF_2)_nCH_2OH$ Alcohols of this type may be prepared by the hydrogenolysis of methyl esters of completely fluorinated aliphatic acids over copper chromite catalyst and reduction of the free acid or acid chloride with lithium aluminum hydride.

As examples of suitable esterifying agents there may be named:

1,1-dihydrotetrafluoropropyl alcohol
1,1-dihydrooctafluoroamyl alcohol
1,1-dihydrododecafluoroheptyl alcohol
1,1-dihydrohexadecafluoroononyl alcohol
1,1-dihydroeicosafluoroundecyl alcohol
1,1-dihydrotetracosafluorotridecyl alcohol
1,1-dihydrooctasafluoropentadecyl alcohol
1,1-dihydrodotricontafluorylheptadecyl alcohol
1,1-dihydropentafluoropropyl alcohol
1,1-dihydroheptafluorobutyl alcohol
1,1-dihydrononafluoroamyl alcohol, and
1,1-dihydropentadecafluoroactyl alcohol Technically, there is no upper limit to the number of carbon atoms which may be present in the esterifying agent. As a practical matter, however, the group of alcohols having from 2 to 18 carbon atoms include the majority of relatively common alcohols and offer a selection of molecule sizes which should be adequate for any purpose.

The esterifying agent need not be a single alcohol. Mixtures of substituted alcohols can be used. Also there can be used a mixture of different chain lengths found in the technical grade of some alcohols. And, if desired, a mixture consisting of an unsubstituted primary or secondary alcohol and a fluorine-containing monohydric alcohol can be used.

ESTERIFICATION

The siliceous substrate to be reacted with the fluoro alcohol should contain surface silanol groups. Pure amorphous silica which has been in contact with moisture has such a surface. The surface must not be covered with other materials which block access to the silanol group. Metal ions on the surface of metal silicates must be exchanged for hydrogen atoms. This can be done by treatment with a hydrogen form of a cation exchange resin or by treatment with an acid as mentioned heretofore. Alternatively, the particles can be coated with a thin layer of silica. The external surface can then be reacted with alcohol.

The inorganic siliceous solid is preferably freed of extraneous material before esterification, and the pH is adjusted to avoid strong acids or alkalis in the reaction.

The amount of water present in the reacting mass during the esterification step has an important bearing on the degree of esterification that will be obtained. Thus, since the esterification process is an equilibrium reaction, it is ordinarily desirable to keep the water content as low as possible during the course of the reaction.

In order to esterify sufficiently to obtain a high proportion of substituted ester groups on the surface of the siliceous particles, the water in the liquid phase of the system should not exceed about 5% by weight of that phase. For maximum esterification, the water content must be kept below about 1.5%. As already mentioned, it is desirable to keep the water content as low as possible.

Because of the hindering effect of water on the esterification, if the siliceous solid to be esterified is wet, the free water must be removed either before the solid is put into the alcohol or alternatively it may be removed by distillation after mixing with the alcohol.

Simple air drying at temperatures of from 100 to 150° C. will remove most of the free water. Drying may be hastened by the application of vacuum. For many types of siliceous solids, however, air drying is not satisfactory because they tend to shrink to hard, compact masses upon drying from water.

Water can suitably be removed from a wet siliceous solid before esterification by displacing the water in the wet mass with a polar organic solvent such as acetone. The solvent can later be recovered.

Preferably, water is removed from wet siliceous solids prior to esterification by azeotropic distillation. Thus, water-wet cake can be mixed with a polar organic solvent such as methyl ethyl ketone and the mixture distilled until the system is freed from water. The organic solvent can then be evaporated to give a dry product for reaction with alcohol.

The ratio of alcohol and siliceous material to be used in the esterification is limited only by the fact that the alcohol should be present in sufficient excess to facilitate a practical rate of reaction. Preferably, sufficient alcohol is used to provide a slurry of the siliceous material in alcohol which can be readily stirred. Of course, larger portions of alcohol must be used when no water is removed from the system during the reaction. The reason for this being that the reaction liberates water and may exceed the maximum permissible value unless alcohol is added either before or during the reaction step.

In general, it is sufficient to carry out the esterification by simply refluxing the mixture of the silica and the alcohol together for a suitable length of time, for example, upwards of 2 hours. In cases where the alcohol is somewhat unstable, it may be desirable to carry out the esterification at somewhat lower temperatures than the boiling point of the alcohol in order to prevent the excessive decomposition in the liquid phase. A preferred method of using unstable alcohols as esterifying agents comprises "heat-activating" the silica and chemically reacting the alcohol with the resulting surface-activated silica in accordance with the invention described and claimed in my copending application Serial No. 261,140, filed December 11, 1951.

In addition, when the alcohol to be used is rather low boiling, that is, less than 100° C., in order to promote more complete reaction than could be realized at the boiling point, it may be desired to carry out the esterification in the autoclave at temperatures of from 200–300° C.

The extent of the reaction is fixed more by the temperature than by the time, that is, at a suitable temperature the esterification reaction proceeds quite rapidly up to a certain point which is characteristic of the temperature and of the alcohol and thereafter proceeds slowly.

The minimum reaction time and temperature in order to obtain any given extent of reaction varies with the alcohol used. While it is difficult to set forth in great detail the relationship between the temperature required for any given extent of reaction and the structure of the alcohol, one skilled in the art may learn from the data the general principles involved and conclude what conditions should be used for another alcohol.

The temperatures substantially below about 100° C. are not suitable in most instances. Alcohol can be adsorbed on the unsaturated siliceous surface at such temperatures but true esterification is not obtained.

The esterification temperature should not exceed the thermal decomposition point of the alcohol while in the presence of siliceous solids. Nor should it exceed the point of thermal stability of the esterified siliceous materials. Preferably, the heating is not prolonged any more than is required to achieve esterification equilibrium.

As already indicated, the reaction between amorphous silica and liquid alcohols can be carried out by autoclaving a slurry of the silica in an excess of the organic reagent. However, when the alcohol is high melting, or unstable above its melting point, it is preferred to carry out the reaction in a dilute solution, say, 10% of the organic reagent in an inert solvent, such as, for instance, benzene, toluene, xylene, trichloroethylene, dioxane and dibutylether of ethylene glycol.

Whether the reaction is effected at atmospheric pressure at the reflux temperature of the solution or under autoclave conditions will largely depend on the boiling point of the solvent used; that is, whether the boiling point is high enough to effect substantial reaction between the silica and the esterifying agent. Occasionally, it is desirable to deposit a mono layer of the high boiling or solid alcohol uniformly over the silica surface by stirring the latter with a solution of the alcohol in a low boiling, inert solvent such as ether or acetone, and then evaporating the solvent while maintaining constant agitation. Complete reaction is then effected by heating the dry, coated product to a temperature sufficiently high to cause removal of water.

After completion of the esterification, the product estersils can be removed from the unreacted alcohol by conventional methods. Thus, the separation can be made by filtration since the estersils consist of particles of supercolloidal size which are retained on ordinary filter media.

Alternatively, the alcohol can be vaporized by applying vacuum to the reaction vessel. Or where the alcohol is one which will distill at atmospheric pressure without decomposition, simple distillation can be used. In the case of higher alcohols which are not readily distilled, except under very high vacuum, the alcohol can be extracted from the product with a low boiling solvent such as, for instance, methyl ethyl ketone, chloroform or ether.

PROPERTIES AND USES OF THE PRODUCTS

The products of the invention are in the form of powders or sometimes lumps or cakes which are pulverable under the pressure of the finger or by a light rubbing action. The esterified inorganic siliceous solids are generally exceedingly fine, light, fluffy, voluminous powders.

The esterification reaction does not substantially change the structure of the inorganic siliceous solid or substrate which was esterified. In other words, the internal structure of the estersil, the structure to which the —$OCH_2(CF_2)X$ groups are chemically bound, has substantially the same particle size, surface area and other characteristics described previously in the discussion of the substrate material. The estersils of the invention are in a colloidal or supercolloidal state of subdivision.

The products of the invention can be organophilic or hydrophobic depending on the degree of esterification. The presence of fluorine atoms can be demonstrated by chemical analysis. The surface properties of the resultant estersils such as, for instance, chemical inertness, reflect their presence on the surface.

By the term "organophilic" I mean that when a pinch of estersil is shaken in a two-phase liquid system of water and n-butanol in a test tube the product will "wet" into the n-butanol phase in preference to the water-phase.

The siliceous products of the invention have chemically bound to the silicon atoms on the surface of the particles at least 50 alcohol molecules per 100 square millimicrons of surface area of the siliceous substrate.

The number of ester groups for 100 square millimicrons of siliceous substrate surface is calculated from the expression:

$$\text{Surface area} = \frac{6.02 \times 10^{23} \times C}{12n \times S_n \times 10^{18}} = \frac{50,200 \times C}{n \times S_n}$$

where C is the weight of the carbon in grams attached to 100 grams of substrate; n is the number of carbon atoms in the —OR groups; $S_n$ is the specific surface area in m.$^2$/g. of the substrate as determined by nitrogen adsorption.

Where the sample to be analyzed is one in which the type of alcohol is unknown, the sample can be decomposed with an acid and the alcohol can be recovered and identified. The specific surface area of the substrate can be determined by first burning off the ester groups, as for example, by slowly heating the estersil in a stream of oxygen up to 500° C. and holding it at that temperature for a period of about three hours and then rehydrating the surface of the particles by exposure to 100% relative humidity at room temperature for several hours and finally determining the surface area of the remaining solid by nitrogen adsorption methods.

In the products of the invention the —$OCH_2(CF_2)X$ groups are chemically bound to the substrate. The products should not be confused with compositions in which an alcohol is merely physically adsorbed on the surface of the siliceous solid. Adsorbed alcohols can be removed by heating the material at relatively low temperature, for example, 150° C. under high vacuum, say $10^{-5}$ millimeters of mercury for a period of one hour. In contrast, the products of my invention are stable under such treatment. Neither can the ester groups be removed by washing with hot methyl ethyl ketone or similar solvents or by prolonged extraction in a Soxhlet extractor. In case of ordinary physical adsorption the alcohol is displaced by such treatment.

The products of the invention are useful as thickening agents in making greases from fluorocarbon oils and as fillers for fluorocarbon polymers such as polytetrafluoroethylene. The products are also useful as fillers in elastomers and particularly in silicone type rubbers.

The invention will be better understood by reference to the following illustrative examples:

Example 1

An aqueous solution of colloidal silica, the particles of which are about 17 millimicrons in diameter and the sol containing 28.7% $SiO_2$ by weight, is allowed to gel at a pH of about 4.5.

The gel is dried at a temperature of 110° C. for a period of 24 hours. The resulting material which is in the form of coherent aggregates of dense ultimate units of amorphous silica is micropulverized to a substantially free-flowing powder. A portion of this material is heated in a muffle furnace in the presence of air for a period of one hour at a temperature of 600° C. in accordance with the invention described and claimed in the copending U. S. application of Warren K. Lowen, Serial No. 261,139, filed December 11, 1951. The heat treatment activates the siliceous surface toward reaction with an alcoholic group.

About 5 parts by weight of the activated silica is slurried with 40 parts by volume of a fluoroalcohol having the formula $H(CF_2)_4CH_2OH$. The resulting slurry is refluxed for a period of 2 hours. The slurry is then filtered. The silica is collected, washed exhaustively with ethyl ether, and dried at a temperature of 100° C. for about 16 hours in a vacuum oven.

The resulting material is a white, free-flowing powder, which contains 1.29% carbon as determined by chemical analysis. The silica has a surface area as determined by nitrogen adsorption of about 175 m.²/g. This corresponds to a degree of esterification of about 80 fluoroalkoxy groups per 100 square millimicrons of silica surface.

Example 2

A water-wet filter cake containing about 6% silica in the form of finely-divided, precipitated, reinforced aggregates of silica is prepared in the following manner:

A 425-pound portion of a sodium silicate solution containing 2.39 grams of $SiO_2$ per 100 milliliters of solution and having a molar $SiO_2:Na_2O$ ratio of 3.25:1 was charged to a 100-gallon steel tank equipped with a one-half horsepower, 400 R. P. M. "Lightnin" mixer driving a 10″ diameter, three-bladed propeller. The silicate is heated to a temperature of 35±2° C. by steam-injection. A sufficient amount (about 162 pounds) of a solution containing 2.40 per cent sulfuric acid was added uniformly over a period of about 30 minutes to bring the pH to 9.7±0.2 as measured at 25° C. During this period the temperature of the reacting mass was maintained below 40° C.

The amount of acid added during the aforementioned step of the process is equivalent to about 80% of the $Na_2O$ in the original sodium silicate. The sodium ion content remains below 0.3 N throughout the process. The clear sol thus obtained is heated to 95° C. in about fifteen minutes. After heating, the sol contains discrete ultimate silicia units which are about 5–7 millimicrons in diameter. They have a pH of about 10.1.

Solutions of sodium silicate and sulfuric acid are then added simultaneously at a uniform rate over a period of two hours through inlets located close to the vortex formed by the agitator. An 85.4-pound portion of the sodium silicate solution is used, which contains 13.22 grams of $SiO_2$ per 100 milliliters of solution and has a molar $SiO_2:Na_2O$ ratio of 3.25:1. The sulfuric acid is a 4.65 per cent aqueous solution and is added in an amount to maintain the pH of the reaction mixture at 10.3±0.2 as measured at 25° C. throughout the course of the reaction. Such an amount is sufficient to neutralize about 80% of the $Na_2O$ in the silicate solution and maintain the sodium ion concentration below 0.3 N throughout the process. The temperature is maintained at 95° C. throughout the addition of acid and silicate.

During the heating of the initial sol the tiny, discrete particles of the sol increase in size. Then, during the initial addition of silicate and acid they may become chemically bound together in the form of open networks or coherent aggregates of supercolloidal size, wherein the colloidal particles are present as dense ultimate units. The aggregates are precipitated. In the subsequent simultaneous addition of silicate and acid the aggregates are reinforced. Since about one part of silica is added for each part of silica in the original sol, the build-up ratio on the aggregates is about 1:1.

Still maintaining a temperature of 95° C. the pH of the solution is adjusted from 10.3 to 5.0 by adding 4.65 per cent sulfuric acid at a rate of about 0.24 gallon per minute for 20 minutes and then adding small portions followed by repeated pH determinations until the pH is 5 as measured at 25° C. This requires about 32 pounds of the sulfuric acid solution.

The slurry thus obtained is then maintained at a temperature of from 85 to 95° C. without agitation for a period of four hours. This is to further coagulate the precipitate to aid in filtration. The precipitate is filtered in several portions on a 50-gallon Nutsche, using nylon cloth as a filter medium. The filter cake is washed on the filter with five displacements of cold water and then sucked to dry as the apparatus permits. The final filter cake contains between 6 and 7 per cent solids. Its pH is adjusted to a pH of 2 to 3 and stored.

One hundred parts by weight of the wet cake is washed by slurring in 1000 parts by volume of water. The slurry is filtered and the silica collected. This procedure is repeated. The wet cake is then slurried in 1000 parts by volume of acetone and the silica filtered from the slurry. The acetone-slurring process is repeated to replace most of the water from the wet cake.

The silica cake is transferred to an excess of an alcohol represented by the formula $H(CF_2)_6CH_2OH$. The resulting slurry is transferred to a distilling apparatus. The temperature of the slurry is gradually raised until the acetone and water are distilled off. The mixture is then heated at a temperature of 154° C. for a period of one hour.

The slurry containing the resulting esterified silica is filtered and the esterified product collected. The product is washed several times with acetone and finally dried at a temperature of 75° C. in a vacuum oven.

The dried material is found to contain 2.52% carbon by chemical analysis. The surface area of the material as determined by nitrogen adsorption is about 290 m.²/g. On the basis of these two values, the product has a degree of esterification of about 65 fluoroalkoxy groups per 100 square millimicrons of silica surface.

*Example 3*

An aqueous solution of colloidal silica, the particles of which are about 30 millimicrons in diameter, containing about 30% $SiO_2$ by weight, is prepared by the method disclosed and claimed in the copending U. S. application of Max F. Bechtold and Omar E. Snyder, Serial No. 65,536, filed December 15, 1948. In brief, their method comprises building up the size of particles in an aqueous silica sol by forming a heel by heating to a temperature above 60° C. an aqueous sol of silica particles of less than 10 millimicrons diameter, adding to the heel a silica sol containing particles less than 10 millimicrons diameter and continuing the addition and heating until at least 5 times as much silica has been added to the heel as was originally present.

The sol thus prepared is deionized by treating it first with a cation-exchanger and then with an anion-exchanger. The deionized sol is dried on a steam bath. It is reduced to a free-flowing powder by ball milling. A portion of the powder is dried in an oven at a temperature of 120° C. for a period of 48 hours.

Ten parts by weight of the dried silica is slurried with 46 parts by weight of a fluoro alcohol having the formula $H(CF_2)_6CH_2OH$. The resulting slurry is heated to a temperature of 150° C. for a period of 2 hours in order to effect surface esterification.

The slurry is then filtered and the solid product collected. The product is slurried with a large volume of acetone, separated from the alcohol by filtration and dried in a vacuum oven at a temperature of 75° C.

The resulting free-flowing white powder is found to contain 1.08% carbon by chemical analysis. The surface area of this material as determined by nitrogen adsorption is about 95 m.²/g. The carbon value and the surface area value correspond to a degree of esterification of about 95 fluoroalkoxy groups per 100 square millimicrons of silica surface.

I claim:

1. A solid consisting essentially of substrate particles of inorganic siliceous material having an average specific surface area of from 1 to 900 square meters per gram having an average particle diameter greater than about 1 millimicron, and having chemically bound to the silicon atoms on the surface of said particles at least 50 —$OCH_2(CF_2)_nX$ group per 100 square millimicrons of surface area of the siliceous material, where X is a member of the group consisting of hydrogen and fluorine and $n$ is an integer of from 1 to 17.

2. A powder consisting essentially of substrate particles of amorphous silica having an average specific surface area of from 25 to 900 square meters per gram having an average particle diameter greater than about 1 millimicron, and having chemically bound to the silicon atoms on the surface of said particles at least 50

—$OCH_2(CF_2)_nX$ groups per 100 square millimicrons of surface area of substrate surface, where X is a member of the group consisting of hydrogen and fluorine and $n$ is an integer no greater than 17.

3. A powder consisting essentially of substrate particles of amorphous silica in a supercolloidal state of subdivision having an average specific surface area of from 200 to 900 square meters per gram, having an average pore diameter of at least 4 millimicrons, and having chemically bound to the silicon atoms on the surface of said particles at least 50 —$OCH_2(CF_2)_nX$ group per 100 square millimicron of surface area of the siliceous material, where X is a member of the group consisting of hydrogen and fluorine and $n$ is an integer no greater than 17.

4. A process which comprises the step of chemically reacting an alcohol of the formula $X(CF_2)_nCH_2OH$ where X is a member of the group consisting of hydrogen and fluorine and $n$ is an integer of from 1 to 17, with an inorganic siliceous material having an average specific surface area of from 1 to 900 square meters per gram having an average particle diameter greater than about 1 millimicron, and having a reactive surface containing groups selected from the class consisting of silanol and heat-activated silicon-oxygen groups, while maintaining the water content of the system below about 5 per cent by weight of the alcohol in the system and the temperature in the range from 100° C. to the thermal decomposition temperature of the alcohol.

5. A process which comprises the step of chemically reacting an alcohol of the formula $X(CF_2)_nCH_2OH$ where X is a member of the group consisting of hydrogen and fluorine and $n$ is an integer of from 1 to 17, with inorganic siliceous particles having an average specific surface area of from 1 to 900 square meters per gram having an average particle diameter greater than about 1 millimicron, and having a reactive surface containing groups selected from the class consisting of silanol and heat-activated silicon-oxygen groups, while maintaining the water content of the system below about 5 per cent by weight of the alcohol in the system and the temperature in the range from 100° C. to the thermal decomposition temperature of the alcohol.

6. A process which comprises the step of chemically reacting an alcohol of the formula $X(CF_2)_nCH_2OH$ where X is a member of the group consisting of hydrogen and fluorine and $n$ is an integer of from 1 to 17, with an inorganic siliceous material in a supercolloidal state of subdivision, having an average specific surface area of from 1 to 900 square meters per gram having an average particle diameter greater than about 1 millimicron, and having a reactive surface containing groups selected from the class consisting of silanol and heat-activated silicon-oxygen groups, while maintaining the water content of the system below about 5 per cent by weight of the alcohol in the system and the temperature in the range from 100° C. to the thermal decomposition temperature of the alcohol until at least 50 —$OCH_2(CF_2)_nX$ groups, where X and $n$ have the same significance as above, per 100 square millimicrons of surface area of said inorganic siliceous solid are chemically bound thereto.

References Cited in the file of this patent

UNITED STATES PATENTS

| | | |
|---|---|---|
| 2,395,880 | Kirk | Mar. 5, 1946 |
| 2,438,379 | Archibald et al. | Mar. 23, 1948 |
| 2,454,941 | Pierce et al. | Nov. 30, 1948 |